June 18, 1929.  L. BERGE  1,717,653

GAUGE DIAL

Filed July 9, 1928

Inventor
Louis Berge
By Blackmore, Spencer & Flint
Attorneys

Patented June 18, 1929.

1,717,653

UNITED STATES PATENT OFFICE.

LOUIS BERGE, OF FLINT, MICHIGAN, ASSIGNOR TO A C SPARK PLUG COMPANY, OF FLINT, MICHIGAN, A COMPANY OF MICHIGAN.

GAUGE DIAL.

Application filed July 9, 1928. Serial No. 291,353.

This invention relates particularly to improvements in the face plates of instruments, and especially to dials for use upon pressure gauges, ammeters, etc., as currently employed upon the instrument boards of automotive vehicles and elsewhere.

This invention involves the provision of one or more depressed dial portions in an instrument face, said depressed portion or portions being arcuate in form, bounded in part by inclined supporting portions, and provided with graduations adapting a pointer or pointers to cooperate therewith,— said pointer or pointers being projected through and oscillable within the limits of a pointer-passing slot or slots provided by a cut made incidentally to the formation of the mentioned depression or depressions and partially bounding the same.

Among the objects of this invention are: economy in materials and labor; economy in space; facility of illumination, facility of installation; and facility of simultaneous inspection,—in the case of combined instruments employing but a single face plate.

Other objects of this invention, eliminating the necessity for separately aperturing a face plate to provide any bearing or clearance for the "staff" of any pointer and providing means for concealing the inner portion of the pointer used, may be best appreciated from the following descriptions of illustrative embodiments of this invention, taken in connection with the appended claims and the accompanying drawings.

Fig. 2 is a side elevational view taken as indicated by the arrow 2 of Fig. 1,—a face plate being, however, shown as sectioned in a median vertical plane.

Figure 1:
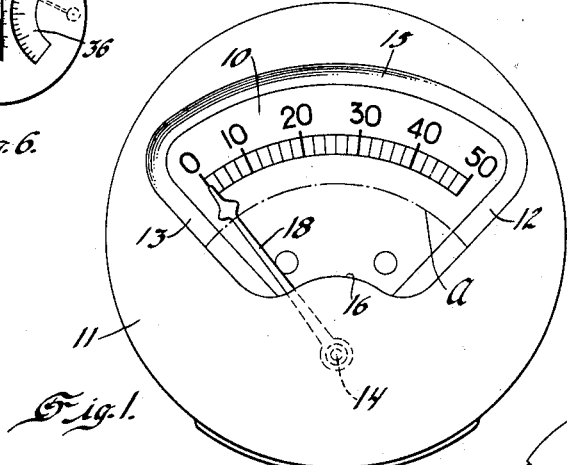
Fig. 1 is a front elevation, showing a face plate provided with a single dial, as for cooperation with the pointer of a pressure gauge,—various parts immaterial to the present invention being eliminated.

Referring first to that embodiment of the present invention illustrated in Figs. 1 and 2, a pressure gauge mechanism 8, requiring no present description, is shown as including a frame member 9; and this is shown as having riveted thereto a dished-out or depressed portion 10 formed from a substantially circular front or face plate 11, having an uninterrupted edge all parts of which lie in the same plane. Inclined sides 12 and 13 of the depressed portion 10 may radiate from the axis "staff" 14 of a suitable pointer or indicating member; and they may be interconnected by an arcuate inclined portion 15,— shown as struck at a uniform radial distance from the axis provided by staff 14. The inclined sides, connecting the depressed portion 10 with the main portion of the circular plate from which this depressed portion is struck, may inwardly begin or terminate at any suitable distance between the free end and the axis of pointer 18; and the formation thereof may follow or incidentally produce an arcuate cut providing an opening 16 through which the pointer 18 may project.

As shown, the cut which provides the opening 16 may be struck at a comparatively short distance from the axial point; or, as suggested by a dot-and-dash line A, it may be cut immediately below, or inward from, the head of the pointer 18,—thereby concealing the pointer stem as well as the axis 14. Suitable graduations, with numerals or other characters or legends, may be placed on the back wall or sunken area provided by the depressed portion 10, to constitute the same an arcuate dial or dial segment, along which the pointer may move for pressure indication,—assuming the instrument involved to be a pressure gauge.

Figure 3:
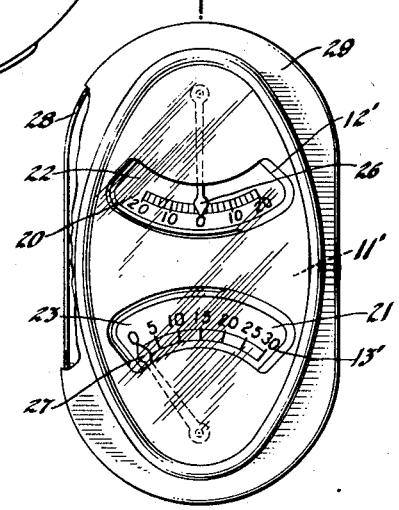
Fig. 3 is an elevational view comparable with Fig. 1, but showing the face plate of a combination instrument which is provided with two dials,—a supporting case being broken away, to show an optional light-admission opening.
Figure 4:
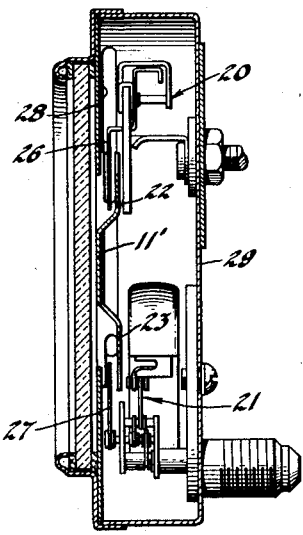
Fig. 4 is a central vertical sectional view, taken substantially as indicated by the line 4—4 of Fig. 3.

Figs. 3 and 4 show a modified form of this invention in which a face plate 11' is formed suitably to use thereof in a combination instrument assembly. In these figures, there are shown parts of an ammeter instrument, indicated generally at 20, and parts of an oil gauge, indicated generally at 21,—the mechanical details and even the general character of these instruments being immaterial to the present invention, except as it will be understood that they are such instruments as are usually provided with separate face plates opposite suitable visibility apertures. A novel face plate 11' being here employed in replacement of the usual individual face plates, it will be seen that separate depressed or dished-out portions 22 and 23 are adapted to provide dials for the respective instruments 20 and 21.

The last-mentioned depressions may be generally similar to those shown in Fig. 1; or actual cuts may optionally extend along the radially disposed lines 12', 13', inclined sides being here avoided in order to allow light rays, from an interior or lateral source, satisfactorily to illuminate any directions and/or graduations placed upon the respective back walls provided by depressions 22 and 23,—serving as dials for pointers 26 and 27. Light rays referred to may be projected through a lateral opening 28 in a casing 29,— the general type of casing here referred to being already known as employed in the indirect lighting of instrument panels.

It will be seen that a single opening, admitting light from a single exterior source, or a single interior light source, may thus be employed to illuminate a plurality of dials provided upon a single front plate; and it will be obvious that, if desired, three or more dials may be provided upon a single front plate and simultaneously illuminated through openings which admit light thereto without corresponding illumination of the remainder of said face plate.

Figure 5:
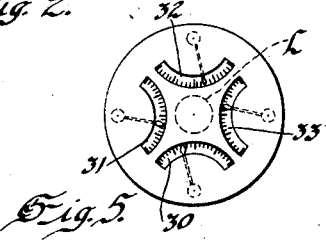
Fig. 5 is a reduced and diagrammatic view corresponding to Fig. 1, but showing a face plate as provided with four separate dial depressions.

The front plate which is diagrammatically illustrated in Fig. 5 discloses four dials, provided by depressions 30, 31, 32 and 33, all conveniently disposed for simultaneous illumination (from any outside source or by means of a concealed interior light L) and for simultaneous inspection.

Figure 6:
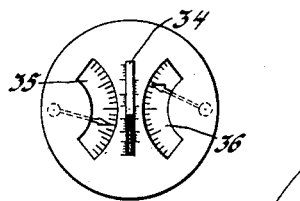
Figs. 6 and 7 are views similar to Fig. 5, but showing further alternatives which are hereinafter separately described.
Figure 7:
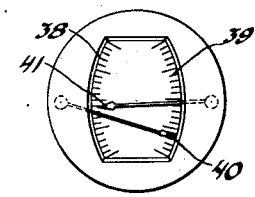

In Fig. 6, the interposition of a thermometer 34 between arcuate dials 35 and 36 is suggested; and Fig. 7 suggests the use of a plurality of dials 38 and 39 so disposed that the pointers 40 and 41 pertaining thereto are overlapped, being disposed in different planes; but the constructions here referred to are suggested merely as illustrative of the scope of the present invention.

It will be seen that the formation of depressions, with openings adjacent thereto, obviates the necessity for projecting the shaft of any pointer directly through a face plate or dial at right angles thereto; and it provides means for concealing the lower or inner portion of the pointer. It also facilitates the mounting of a plurality of instruments for use within a common casing, a common face plate being employed therewith, and it provides a highly advantageous method of grouping two or more different instruments, concentrating these instruments within a small oval, circular or other area; and this area need not be substantially larger than the face of a common "dash" clock or a speedometer. The resultant facility of installation and the facility of simultaneous inspection of instruments are obvious.

Although the foregoing description has referred to but a limited number of alternate embodiments of this invention, it will be understood that these are merely illustrative, and that numerous additional forms might easily be devised, without involving the slightest departure from the spirit and scope of this invention, as the same is indicated above and in the following claims.

I claim:

1. A one-piece instrument face plate provided with at least one depressed dial portion which is bounded by an inclined portion and by a pointer-passing cut therein, said plate being adapted to conceal the axis of a cooperating pointer, and said inclined portion serving to support said depressed portion from said plate.

2. A one-piece instrument face plate provided with at least one depressed dial portion which is bounded by an inclined portion and by a pointer-passing cut therein, said plate being adapted to conceal the axis of the cooperating pointer and said dial portion being arcuate in form, and said inclined portion serving to support said depressed portion from said plate.

3. A combination instrument including: a plurality of pointers adapted respectively to cooperate with separate dials; and a single face plate including separate dials,—said dials being provided by depressed portions of said face plate and each depressed portion being bounded, in part, by an inclined portion and, in part, by a pointer-passing cut.

4. A combination instrument including: a plurality of pointers adapted respectively to cooperate with separate dials; and a single face plate including separate dials,—said dials being provided by depressed portions of said face plate and each depressed portion being bounded, in part, by an inclined portion and, in part, by a pointer-passing cut, and said cuts being so formed as to admit light from a common source to said dials.

5. A combination instrument including: a plurality of pointers adapted respectively to cooperate with separate dials; and a single face plate including separate dials,—said dials being provided by depressed portions of said face plate, and each depressed portion being bounded, in part, by an inclined portion and, in part, by a pointer-passing cut, and said instrument being provided with a casing which has a lateral opening, said cuts being so formed as to admit light from said opening.

6. An instrument face plate provided with an integral and substantially arcuate dial depression, and with means for laterally admitting light to illuminate said depression without corresponding illumination of other parts.

7. An instrument face plate provided with an integral and substantially arcuate dial depression, with means for laterally admitting light to illuminate said depression without corresponding illumination of other parts and with a pointer-passing opening at one side of said depression.

8. An instrument face plate provided with an integral and substantially arcuate dial depression, with means for laterally admitting light to illuminate said depression without corresponding illumination of other parts and with a pointer-passing opening at one side of said depression,—said opening being formed by an arcuate cut.

9. An instrument face plate provided with an integral and substantially arcuate dial depression, all edge portions of said plate being disposed in a common plane different from that of said depression.

10. An instrument face plate provided with integral and depressed dial areas and with means for admitting light thereto without corresponding illumination of the remainder of said face plate.

In testimony whereof I affix my signature.

LOUIS BERGE.